(12) United States Patent
Lee et al.

(10) Patent No.: US 9,246,249 B2
(45) Date of Patent: Jan. 26, 2016

(54) CARD CONNECTOR FOR DIFFERENT SPECIFICATIONS OF ELECTRONIC CARDS

(71) Applicant: Proconn Technology Co., Ltd., New Taipei (TW)

(72) Inventors: Yun Chien Lee, New Taipei (TW); Ta Chih Yu, New Taipei (TW)

(73) Assignee: PROCONN TECHNOLOGY CO., LTD., New Taipei (TW)

( * ) Notice: Subject to any disclaimer, the term of this patent is extended or adjusted under 35 U.S.C. 154(b) by 118 days.

(21) Appl. No.: 14/277,285

(22) Filed: May 14, 2014

(65) Prior Publication Data
US 2015/0333422 A1  Nov. 19, 2015

(51) Int. Cl.
*H01R 13/62* (2006.01)
*H01R 12/70* (2011.01)
*H01R 13/635* (2006.01)

(52) U.S. Cl.
CPC .......... *H01R 12/7005* (2013.01); *H01R 13/635* (2013.01)

(58) Field of Classification Search
CPC . G06K 13/08; G06K 7/0021; H01R 23/6873; H01R 7/1478; H01R 13/62905; H01R 13/5213
USPC .............................. 439/159, 630, 607.31, 946
See application file for complete search history.

(56) References Cited

U.S. PATENT DOCUMENTS

| | | | | |
|---|---|---|---|---|
| 6,991,480 B2 * | 1/2006 | Katayanagi | .......... | G06K 7/0043 439/159 |
| 7,040,908 B2 * | 5/2006 | Kamata | .............. | H01R 13/6335 439/159 |
| 7,344,416 B2 * | 3/2008 | Quijin | .................. | G06K 7/0034 439/540.1 |
| 7,811,106 B2 * | 10/2010 | Lin | ........................ | G06K 13/08 439/159 |
| 8,337,223 B2 * | 12/2012 | Gao | .................... | G06K 13/0856 439/159 |
| 8,734,188 B2 * | 5/2014 | Nakase | .................. | H04M 1/026 439/159 |
| 8,747,131 B2 * | 6/2014 | Nakase | .............. | G06K 13/0831 439/159 |
| 2005/0048833 A1 * | 3/2005 | Kimura | ................ | G06K 7/0013 439/377 |

* cited by examiner

*Primary Examiner* — Hae Moon Hyeon
(74) *Attorney, Agent, or Firm* — WPAT, P.C.; Anthony King

(57) ABSTRACT

A card connector includes an insulating housing, signal terminals disposed in the insulating housing, a shell worn around the insulating housing, a tray with a platform being protruded on a top face thereof, and an ejector pivoted on a top plate of the shell and rotatably paralleling to the top plate. The tray is slidably disposed between the insulating housing and the top plate of the shell along a front-to-rear direction and defines two card slots arranged side-by-side at two sides thereof. One end of the ejector has a pushing portion projecting sideward beyond one side plate of the shell, and the other end of the ejector protrudes forward to form an ejecting portion which resists against the back of the platform for pushing the tray to slide frontward out of the card connector by pushing the pushing portion rearward to drive the ejector to clockwise rotate.

9 Claims, 4 Drawing Sheets

CARD CONNECTOR FOR DIFFERENT SPECIFICATIONS OF ELECTRONIC CARDS

BACKGROUND OF THE INVENTION

1. Field of the Invention

The present invention relates to a connector, and more particularly to a card connector.

2. The Related Art

Along with the development of modern information technology, card connectors are used more and more frequently in electronic products for connecting electronic cards with the products. Also various specifications and capacity of electronic cards such as secured digital (SD) cards and subscriber identity module (SIM) cards are provided for users in our daily life. A known card connector is designed with double card slots for different specifications of the electronic cards, wherein the double card slots are arranged to overlap with each other. The card connector has an ejection module of multiple rod structure.

Because the ejection module is a multiple rod structure which has a very complex structure and needs large space in the card connector, the card connector is unable to meet the miniaturization requirements for modern mobile phones and other electronic products.

SUMMARY OF THE INVENTION

Accordingly, an object of the present invention is to provide a card connector adapted for different specifications of a first electronic card and a second electronic card. The card connector includes an insulating housing, a plurality of first signal terminals and a plurality of second signal terminals disposed in two sides of the insulating housing, a shell which is worn around the insulating housing and has a top plate, a bottom plate and two side plates, a tray of which a top face protrudes upward to form a platform, and an ejector. The tray defines a first card slot and a second card slot arranged side-by-side at two sides thereof for receiving the first electronic card and the second electronic card respectively. The tray is slidably disposed between the insulating housing and the top plate of the shell along a front-to-rear direction. The ejector is pivoted on the top plate of the shell and rotatably parallels to the top plate. One end of the ejector has a pushing portion projecting sideward beyond one side plate of the shell, and the other end of the ejector protrudes forward to form an ejecting portion.

When the tray is in the card connector, electrical connections are achieved between the first electronic card and the first signal terminals and between the second electronic card and the second signal terminals respectively, and the ejecting portion of the ejector resists against the back of the platform of the tray. When push the pushing portion rearward to drive the ejector to clockwise rotate on the top plate of the shell, the ejecting portion of the ejector pushes the platform of the tray to drive the tray to slide frontward along the insulating housing and the shell out of the card connector.

As described above, the ejector of the card connector is a simple single-rod structure and rotatably mounted on the top plate of the shell. In use, by pushing the pushing portion to bring the ejecting portion to push the platform, the tray can be conventionally ejected out of the card connector. The simple single-rod structure of the ejector can keep the card connector cost down and make for the miniaturization of the card connector.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
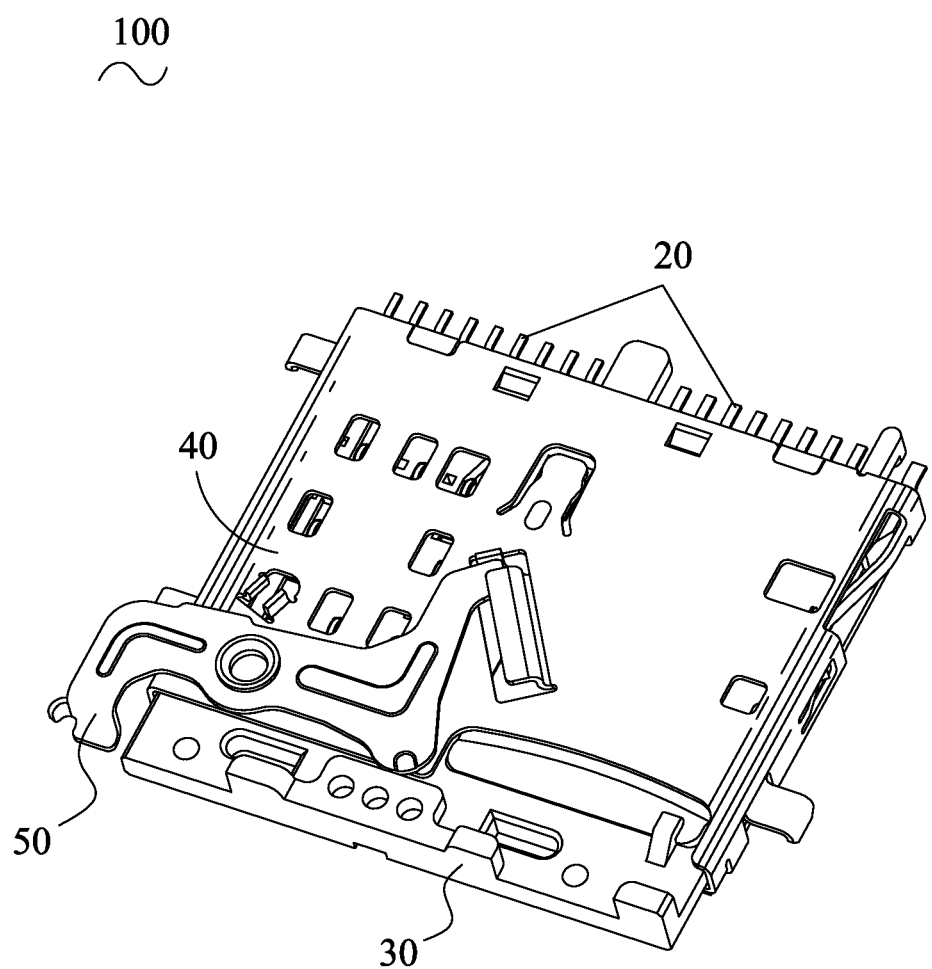
FIG. 1 is a perspective view of a card connector according to an embodiment of the present invention.
Figure 2:
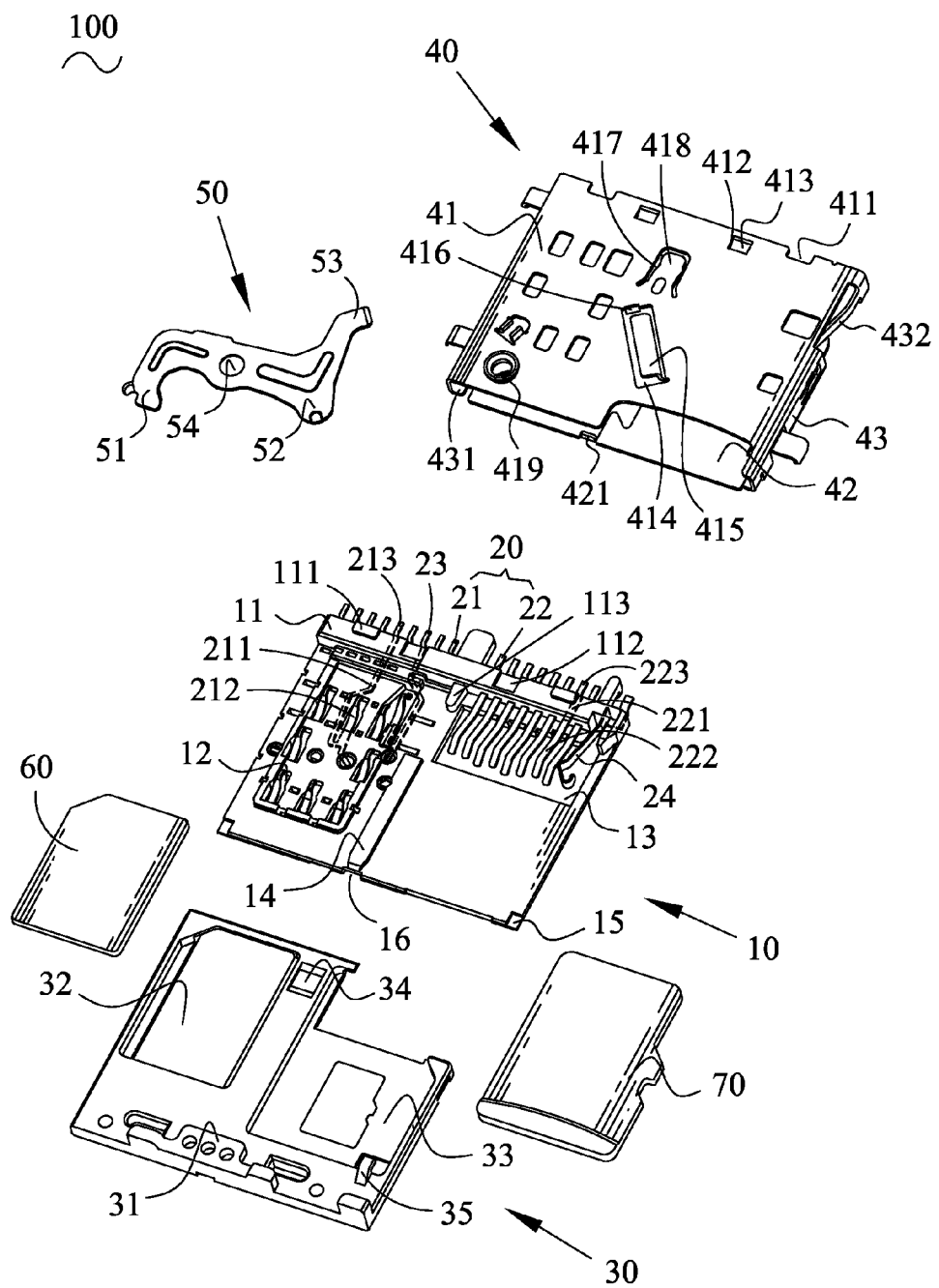
FIG. 2 is an exploded view of the card connector of FIG. 1.

With reference to FIG. 1 and FIG. 2, a card connector 100 in accordance with an embodiment of the present invention is adapted for different specifications of a first electronic card 60 and a second electronic card 70. The card connector 100 includes an insulating housing 10, a plurality of signal terminals 20, a tray 30, a shell 40 and an ejector 50.

A rear end of the insulating housing 10 protrudes upward to form a retaining wall 11. Two sides of a top face of the retaining wall 11 protrude upward to form two locking blocks 111, and the top face of the retaining wall 11 defines two locking grooves 112 arranged between the two locking blocks 111. A wedge 113 is protruded at a rear of a top side of the insulating housing 10 and located in the front of the retaining wall 11. A substantial middle of the top side of the insulating housing 10 protrudes upward to form a sliding rib 14 extending along a front-to-rear direction. The insulating housing 10 further defines a plurality of first signal terminal grooves 12 and a second signal terminal groove 13 arranged at two sides of the sliding rib 14. Front ends of two opposite side edges of the insulating housing 10 define two gaps 15. A front edge of the insulating housing 10 defines a fixing notch 16 at the middle thereof.

Referring to FIG. 2, the signal terminals 20 are integrated in the insulating housing 10. The signal terminals 20 include a plurality of first signal terminals 21 and a plurality of second signal terminals 22. The first signal terminals 21 and the signal terminals 22 are disposed in two sides of the insulating housing 10. In detail, each of the first signal terminals 21 has a first fastening portion 211, a first contact portion 212 and a first welding portion 213. The first fastening portion 211 is embedded in one side of the rear end of the insulating housing 10, the first welding portion 213 projects behind the insulating housing 10, and the first contact portion 212 is elastically received in the first signal terminal groove 12. Each of the second signal terminals 22 has a second fastening portion 221, a second contact portion 222 and a second welding portion 223. The second fastening portion 221 is embedded in the other side of the rear end of the insulating housing 10, the second welding portion 223 projects behind the insulating housing 10, and the second contact portion 222 is elastically received in the second signal terminal groove 13.

In this embodiment of the invention, the card connector 100 further includes a first detecting terminal 23 and a second detecting terminal 24 which are integrated in the rear of the insulating housing 10. The first detecting terminal 23 is arranged together with the first signal terminals 21 and the second detecting terminal 24 is arranged together with the second signal terminals 22. The first detecting terminal 23 and the second detecting terminal 24 further project beyond a top side of the insulating housing 10.

Figure 3:
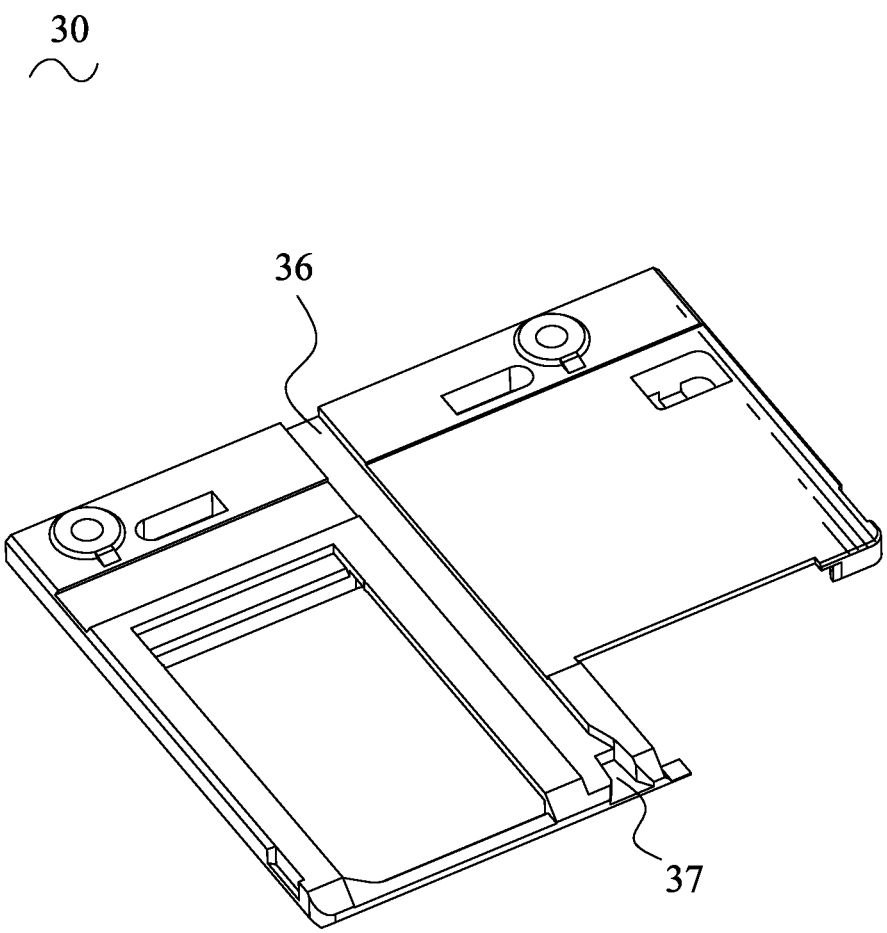
FIG. 3 is a perspective view of a tray of the card connector of FIG. 2.

Referring to FIG. 2 and FIG. 3, a top face of the tray 30 protrudes upward to form a platform 31 extending transversely in a substantial middle of the front thereof. The tray 30 defines a first card slot 32 and a second card slot 33 arranged side-by-side at two sides thereof for receiving the first electronic card 60 and the second electronic card 70 respectively. A rear of the top face of the tray 30 defines a fixing fillister 34 between the first card slot 32 and the second card slot 33. A front edge of the second card slot 33 protrudes upward and then extends backward to form a buckle 35. A bottom face of the tray 30 defines a sliding groove 36 extending along a front-to-rear direction between the first card slot 32 and the second card slot 33 and penetrating through a rear end of the tray 30. The rear end of the tray 30 further defines an inserting fillister 37 adjacent to the sliding groove 36.

Figure 4:
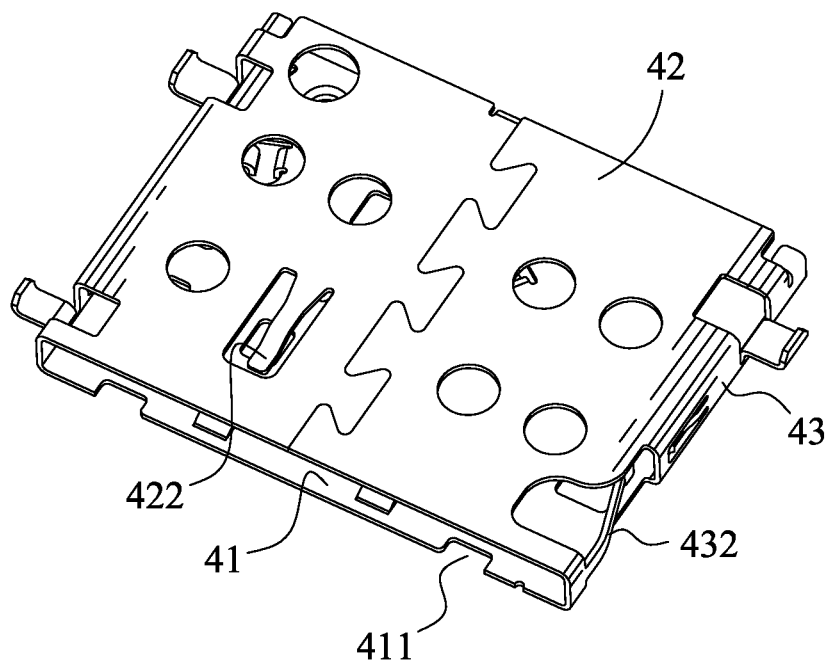
FIG. 4 is a perspective view of a shell of the card connector of FIG. 2.

Referring to FIG. 2 and FIG. 4, the shell 40 has a top plate 41, a bottom plate 42 and two side plates 43 which together show a rectangular tubular shape. Two sides of a rear end of the top plate 41 are opened with two locking slots 411. The rear end of the top plate 41 further defines two square holes 412 arranged between the two locking slots 411. A rear edge of each square hole 412 extends forward and downward to form a locking arm 413. The top plate 41 of the shell 40 protrudes upward to form a pivoting portion 419 located at one side of a front thereof for pivoting the ejector 50 on the top plate 41. The diameter of the top end of the pivoting portion 419 is greater than that of the bottom end thereof. A substantial middle of the top plate 41 of the shell 40 defines a receiving groove 414 extending along a rotating direction of the ejector 50. One side edge of the receiving groove 414 protrudes upward and then is bent towards the ejector 50 to form a reversed-L shaped restraining plate 415 located over the receiving groove 414. A rear edge of the receiving groove 414 protrudes upward to form a limit portion 416. A rear of the top plate 41 of the shell 40 defines a through hole 417 according to the fixing fillister 34 of the tray 30. A front edge of the through hole 417 slantwise extends backward and downward to form a fixing slice 418. The middle of a front edge of the bottom plate 42 protrudes upward to form a stator 421. A rear of one side of the bottom plate 42 of the shell 40 is die-cut upward to form a first detecting arm 422. Front edges of two side plates 43 are die-cut and bent inward to form two fixing portions 431. A rear of the side plate 43 away from the first detecting arm 422 is die-cut inward to form a second detecting arm 432. In this embodiment of the invention, the pivoting portion 419 is a rivet.

Referring to FIG. 2, one end of the ejector 50 has a pushing portion 51, and the other end of the ejector 50 protrudes forward to form an ejecting portion 52 and extends backward to form a balance arm 53. A pivoting hole 54 is vertically opened through the ejector 50. In this embodiment of the invention, the ejecting portion 52 of the ejector 50 is of arched shape.

Referring to FIG. 1, FIG. 2, FIG. 3 and FIG. 4, in assembly, the shell 40 is worn rearward around the insulating housing 10 with the first detecting terminal 23 apart facing the first detecting arm 422 and the second detecting terminal 24 apart facing the second detecting arm 432. The stator 421 of the shell 40 is buckled in the fixing notch 16 of the insulating housing 10, and the fixing portions 431 of the shell 40 are buckled in the gaps 15 of the insulating housing 10 respectively. The locking blocks 111 of the insulating housing 10 are buckled in the locking slots 411 of the shell 40 respectively, and the locking arms 413 of the shell 40 are buckled in the locking grooves 112 of the insulating housing 10 respectively. So the shell 40 and the insulating housing 10 can be firmly assembled together. The ejector 50 is pivoted on the top plate 41 of the shell 40 by virtue of the cooperation of the pivoting hole 54 and the pivoting portion 419 and rotatably parallels to the top plate 41. The balance arm 53 of the ejector 50 is movably restrained under the restraining plate 415 and in front of the limit portion 416. The pushing portion 51 of the ejector 50 projects sideward beyond one side plate 43 of the shell 40 near to the pivoting portion 419. The tray 30 is slidably disposed between the insulating housing 10 and the top plate 41 of the shell 40 along the front-to-rear direction by the sliding rib 14 of the insulating housing 10 being slidably disposed in the sliding groove 37 of the tray 30. When the tray 30 is in the card connector 100, the ejecting portion 52 of the ejector 50 resists against the back of the platform 31 of the tray 30, the wedge 113 of the insulating housing 10 is inserted in the inserting fillister 36 of the tray 30, and the fixing slice 418 of the shell 40 is buckled in the fixing fillister 34 of the tray 30 to avoid the tray 30 sliding out of the insulating housing 10 and the shell 40.

When using the card connector 100, push the pushing portion 51 rearward to drive the ejector 50 to clockwise rotate on the top plate 41 of the shell 40. At this moment, the ejecting portion 52 of the ejector 50 pushes the platform 31 of the tray 30 to drive the tray 30 to slide frontward along the insulating housing 10 and the shell 40 out of the card connector 100. Then put the first electronic card 60 in the first card slot 32 and the second electronic card 70 in the second card slot 33, and the front edge of the second electronic card 70 is buckled in the buckle 35 of the tray 30. After putting the first electronic card 60 and the second electronic card 70 in the tray 30, push the platform 31 to drive the tray 30 to slide rearward into the card connector 100. In the process of the clockwise rotation and the anticlockwise restoration of the ejector 50, the restraining plate 415 restrains the balance arm 53 to avoid an anticlinal upwarp of the ejector 50 and the limit portion 416 can block the balance arm 53 to avoid an excessive restoration of the ejector 50.

When the tray 30 together with the first electronic card 60 and the second electronic card 70 are in the card connector 100, electrical connections are achieved between the first electronic card 60 and the first signal terminals 21 and between the second electronic card 70 and the second signal terminals 22 respectively. Furthermore, the first detecting terminal 23 and the second detecting terminal 24 are pressed by the first electronic card 60 downward and the second electronic card 70 sideward to electrically contact with the first detecting arm 422 and the second detecting arm 432 so as to make sure the first electronic card 60 and the second electronic card 70 are installed in the tray 30 successfully.

As described above, the ejector 50 of the card connector 100 is a simple single-rod structure and rotatably mounted on the top plate 41 of the shell 40. In use, by pushing the pushing portion 51 to bring the ejecting portion 52 to push the platform 31, the tray 30 can be conventionally ejected out of the card connector 100. The simple single-rod structure of the ejector 50 can keep the card connector 100 cost down and make for the miniaturization of the card connector 100.

What is claimed is:

1. A card connector adapted for different specifications of a first electronic card and a second electronic card, comprising:
    an insulating housing;
    a plurality of first signal terminals and a plurality of second signal terminals disposed in two sides of the insulating housing;
    a shell having a top plate, a bottom plate and two side plates, the shell being worn around the insulating housing;

a tray of which a top face protrudes upward to form a platform, the tray defining a first card slot and a second card slot arranged side-by-side at two sides thereof for receiving the first electronic card and the second electronic card respectively, the tray being slidably disposed between the insulating housing and the top plate of the shell along a front-to-rear direction; and an ejector pivoted on the top plate of the shell and rotatably paralleling to the top plate, one end of the ejector having a pushing portion projecting sideward beyond one side plate of the shell, and the other end of the ejector protruding forward to form an ejecting portion;

wherein when the tray is in the card connector, electrical connections are achieved between the first electronic card and the first signal terminals and between the second electronic card and the second signal terminals respectively, the ejecting portion of the ejector resists against the back of the platform of the tray; when push the pushing portion rearward to drive the ejector to clockwise rotate on the top plate of the shell, the ejecting portion of the ejector pushes the platform of the tray to drive the tray to slide frontward along the insulating housing and the shell out of the card connector.

2. The card connector as claimed in claim 1, wherein the ejecting portion of the ejector is of arched shape.

3. The card connector as claimed in claim 1, wherein the top plate of the shell protrudes upward to form a pivoting portion located at one side of a front thereof, a pivoting hole is vertically opened through the ejector for pivoting the ejector to the pivoting portion of the shell.

4. The card connector as claimed in claim 3, wherein the pivoting portion is a rivet.

5. The card connector as claimed in claim 1, wherein a substantial middle of the top plate of the shell defines a receiving groove extending along a rotating direction of the ejector, one side edge of the receiving groove away from the pushing portion of the ejector protrudes upward and then is bent towards the ejector to form a reversed-L shaped restraining plate located over the receiving groove, a rear edge of the receiving groove protrudes upward to form a limit portion, the other end of the ejector slantwise extends backward to form a balance arm, the balance arm of the ejector is movably restrained under the restraining plate and in front of the limit portion.

6. The card connector as claimed in claim 1, wherein a rear of the top face of the tray defines a fixing fillister between the first card slot and the second card slot, the platform is protruded at a substantial middle of a front of the top face of the tray, a rear of the top plate of the shell defines a through hole according to the fixing fillister of the tray, a front edge of the through hole slantwise extends backward and downward to form a fixing slice, the fixing slice of the shell is buckled in the fixing fillister of the tray when the tray is in the card connector.

7. The card connector as claimed in claim 1, wherein a bottom face of the tray defines a sliding groove extending along a front-to-rear direction between the first card slot and the second card slot and penetrating through a rear end of the tray, the rear end of the tray further defines an inserting fillister adjacent to the sliding groove, a substantial middle of a top side of the insulating housing protrudes upward to form a sliding rib extending along a front-to-rear direction and slidably disposed in the sliding groove of the tray, and a wedge is further protruded at a rear of the top side of the insulating housing and inserted in the inserting fillister when the tray is in the card connector.

8. The card connector as claimed in claim 1, wherein a rear of one side of the bottom plate of the shell is die-cut upward to form a first detecting arm, a rear of the side plate away from the first detecting arm is die-cut inward to form a second detecting arm, the card connector further includes a first detecting terminal and a second detecting terminal integrated in the insulating housing, the first detecting terminal is arranged together with the first signal terminals and apart faces the first detecting arm of the shell, the second detecting terminal is arranged together with the second signal terminals and apart faces the second detecting arm of the shell, the first detecting terminal and the second detecting terminal further project beyond a top side of the insulating housing and are pressed by the first electronic card downward and the second electronic card sideward to electrically contact with the first detecting arm and the second detecting arm when the tray is in the card connector.

9. The card connector as claimed in claim 1, wherein a front edge of the second card slot protrudes upward and then extends rearward to form a buckle, a front end of the second electronic card is buckled in the buckle of the tray.

\* \* \* \* \*